United States Patent
Dorai et al.

(10) Patent No.: US 7,904,591 B2
(45) Date of Patent: Mar. 8, 2011

(54) METHOD AND SYSTEM FOR CONTENT SIMILARITY-BASED MESSAGE ROUTING AND SUBSCRIPTION MATCHING

(75) Inventors: Chitra Dorai, Chappaqua, NY (US); Edith Helen Stern, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 12/051,422

(22) Filed: Mar. 19, 2008

(65) Prior Publication Data

US 2008/0215751 A1 Sep. 4, 2008

Related U.S. Application Data

(63) Continuation of application No. 11/439,024, filed on May 23, 2006, now Pat. No. 7,487,260.

(51) Int. Cl.
*G06F 15/173* (2006.01)
(52) U.S. Cl. ......... 709/238; 709/206; 709/217; 709/218; 709/219; 709/225; 709/226; 709/232; 709/240
(58) Field of Classification Search .................. 709/206, 709/217, 218, 219, 225, 226, 232, 238, 240
See application file for complete search history.

(56) References Cited

U.S. PATENT DOCUMENTS

| 5,841,979 | A | * | 11/1998 | Schulhof et al. | 709/237 |
| 5,896,128 | A | * | 4/1999 | Boyer | 715/716 |
| 6,940,858 | B1 | * | 9/2005 | Hunlich | 370/392 |
| 2005/0027880 | A1 | * | 2/2005 | Emmot | 709/238 |
| 2005/0286464 | A1 | * | 12/2005 | Saadawi et al. | 370/328 |
| 2007/0198641 | A1 | * | 8/2007 | Dorai et al. | 709/206 |
| 2007/0204300 | A1 | * | 8/2007 | Markley et al. | 725/46 |

OTHER PUBLICATIONS

Jin et al., "Relational Subscription Middleware for Internet-Scale Publish-Subscribe", DEBS '03, Jun. 8, 2003, San Diego, CA, ACM pp. 1-8.

* cited by examiner

*Primary Examiner* — Liangche A Wang
(74) *Attorney, Agent, or Firm* — Yee & Associates, P.C.; Louis J. Percello

(57) ABSTRACT

Computer implemented method, system and computer usable program code for routing messages in a message stream. A computer implemented method for routing messages in a message stream includes receiving a specification of desired messages, the specification containing a payload and receiving at least one message, the message containing a payload. The message payload is evaluated with respect to the specification payload and the specification, and the message is routed in accordance with the evaluation.

35 Claims, 5 Drawing Sheets

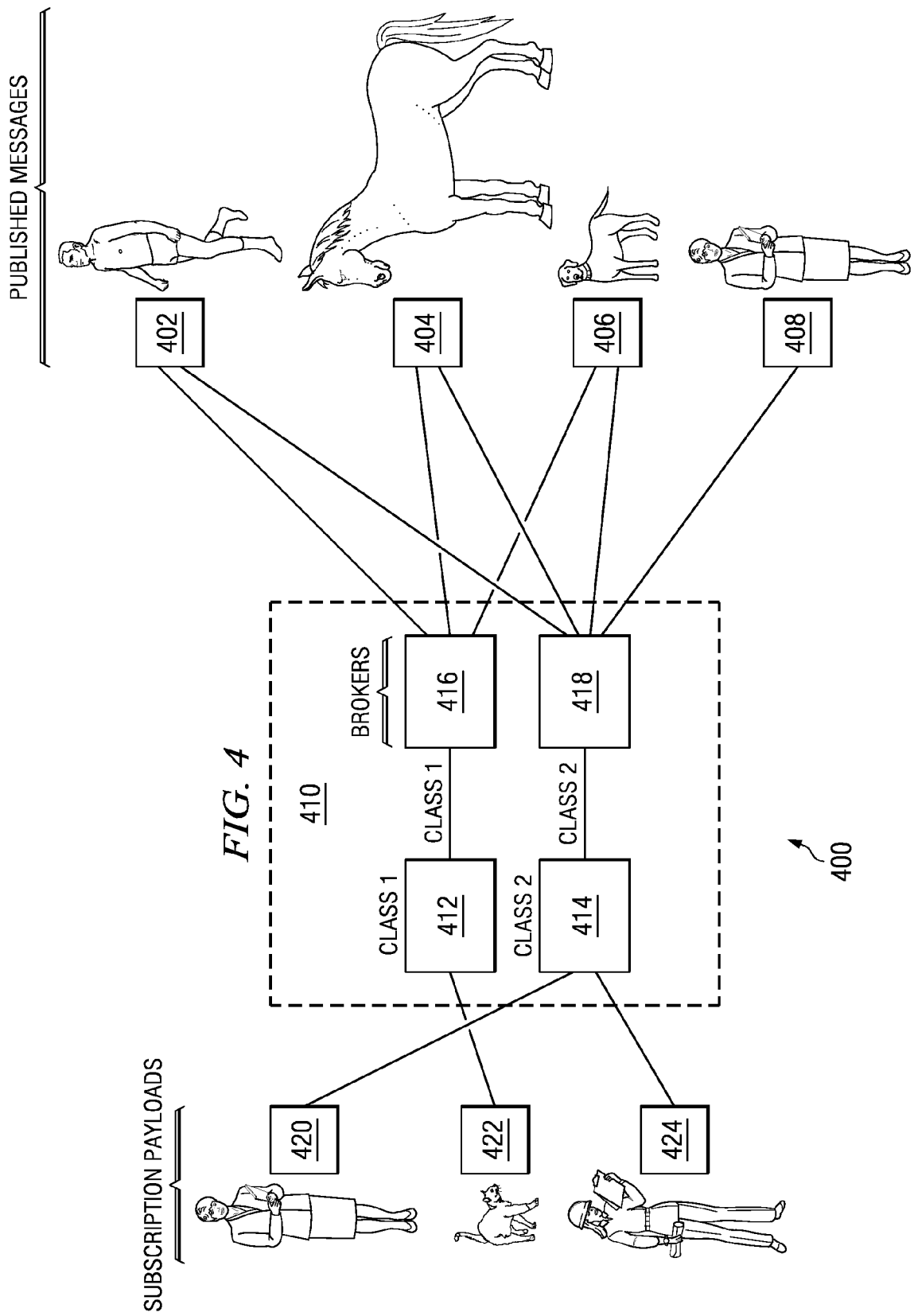

FIG. 5

| FIELD | DESCRIPTION |
|---|---|
| SUBSCRIBER INFORMATION | ADDRESS, COMPANY OR GROUP NAME, SECURITY ACCESS LEVEL, MAXIMUM MESSAGE SIZE... |
| TOPIC OF SUBSCRIPTION | TOPIC TO BE COMPARED TO TOPICS IN MESSAGE HEADER |
| CONSTRAINTS ON UNSTRUCTURED MESSAGE PAYLOAD | QUALITY CONSTRAINTS, SENSOR VIEWPOINTS, ZOOM FACTOR |
| KEYWORD 1<br>KEYWORD 2<br>⋮<br>KEYWORD n | DESCRIPTIVE INFORMATION WHICH MAY BE GLEANED THROUGH ANALYSIS OF UNSTRUCTURED PAYLOAD |
| SAMPLE PAYLOAD 1<br>SAMPLE PAYLOAD 2<br>⋮<br>SAMPLE PAYLOAD m | SPECIFIED UNSTRUCTURED INFORMATION USED FOR COMPARISON OF MESSAGE PAYLOAD FOR FUZZY SIMILARITY MATCHING |
| TRUE/FALSE INDICATOR | SIMILARITY OR DISSIMILARITY REQUEST |
| DEGREE OF MATCH DESIRED | CONFIDENCE FACTOR, H/M/L, OTHER FORMS |

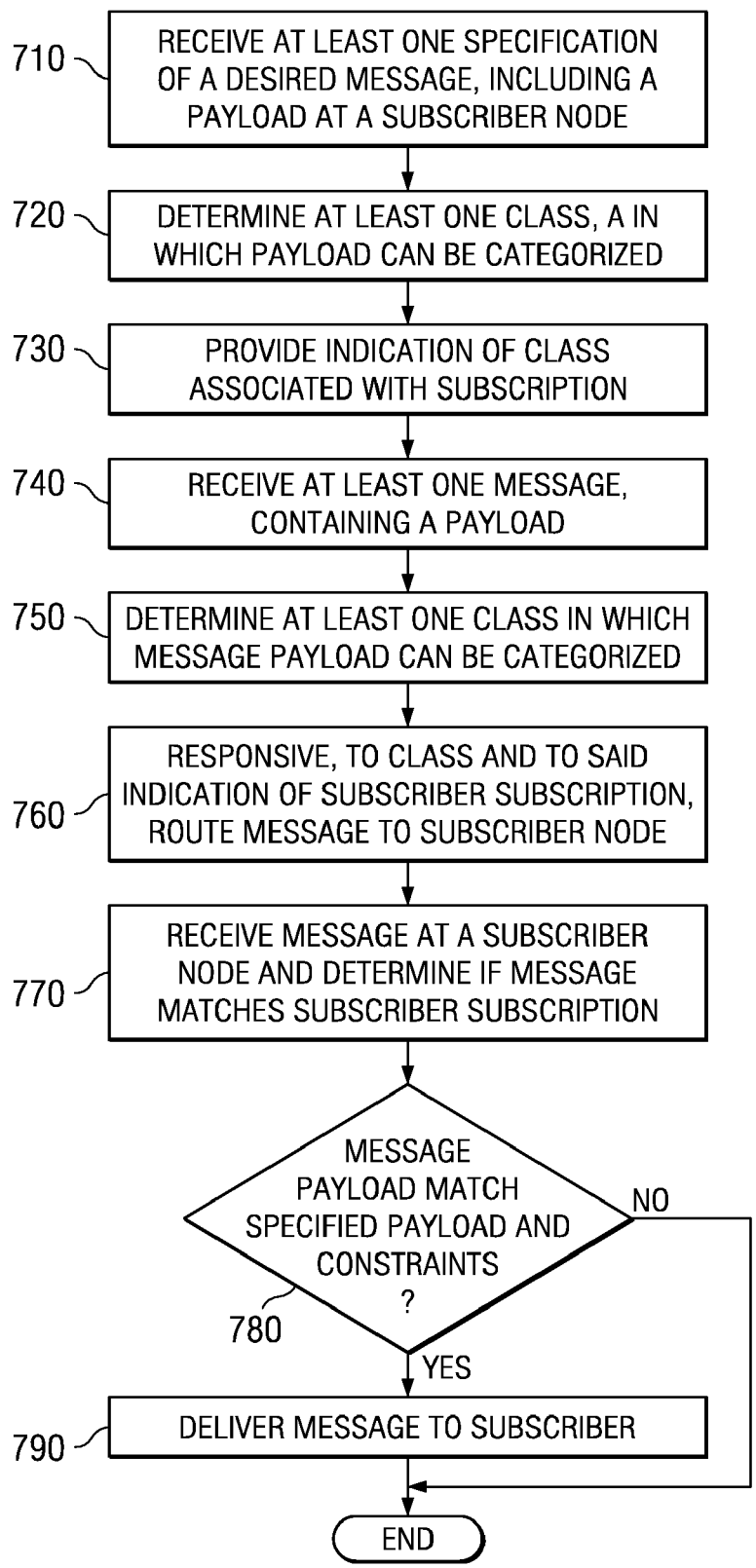

METHOD AND SYSTEM FOR CONTENT SIMILARITY-BASED MESSAGE ROUTING AND SUBSCRIPTION MATCHING

This application is a continuation of application Ser. No. 11/439,024, filed May 23, 2006, now U.S. Pat. No. 7,487,260.

BACKGROUND OF THE INVENTION

1. Field of the Invention

The present invention relates generally to the data processing field, and more particularly, to a computer implemented method, system and computer usable program code for routing and delivering messages based on unstructured information payloads.

2. Description of the Related Art

A publish-subscribe messaging system has two types of clients: publisher clients and subscriber clients. Publisher clients generate messages, also referred to as events. Subscriber clients request a criterion, also called a subscription, specifying the kind of information to be delivered in the future based on published messages. Publishers and subscribers are anonymous to each other, meaning that publishers do not necessarily know how many subscribers there are or where they are located; and subscribers do not necessarily know where publishers are located.

A message typically has three parts: a header, properties, and a body. A message header includes a number of pre-defined fields that contain values that can be used to identify and route the message. Properties for a message can be created and values set, if there is a need to add values in addition to those provided by the header fields of the message. Message properties can be used, for example, to select messages by specifying a criterion based on the messages. A message body can be used to send and receive data in many different forms. Both message properties and the message body are optional and are often left empty.

A topic-based publish-subscribe messaging system is a messaging system in which subscriptions specify topics, which are header fields of messages that subscriber clients wish to receive. A content-based publish-subscribe messaging system is a messaging system in which the messages delivered to a subscriber are based on the content of published messages that are specified as values of some message properties. The subscription criterion is a message property that can be tested on each message independent of any other message. For example, a filter may determine whether "topic=stock-ticker/GE" or "Stock/IBM/trade:volume>1000".

Content-based or topic-based publish-subscribe messaging systems are stateless systems, that is, systems in which the handling of one message does not affect the handling of any other message. These publish-subscribe (pubsub) systems are often used for applications providing dynamic information, such as real time stock quotes for Web pages. For example, a Web page using a publish-subscribe messaging system could reflect IBM stock prices as they change. Rather than the page being refreshed every time the IBM stock price changes, a pubsub filter may be specified such that changes are pushed to the Web page only when the price of the stock exceeds $100.

Content-based publish-subscribe messaging systems support only a limited filtering capability. To address this deficiency, mediations to process or transform messages may be introduced into the flow of traditional messaging middleware. However, mediations are complex to program and require external database services in order to store and access state. Further, groups of mediators are not easily combined.

Generally, mediations examine individual messages and perform their task in relation to those individual messages. However, there are some mediations or message transformations which examine multiple messages or even multiple message streams in order to perform their task. An example is a mediation that provides an "average" computation or a "join and filter" computation. SMILE technology (see "Relational Subscription Middleware for Internet-Scale Publish-Subscribe", Yuhui Jin and Rob Strom, 2nd International Workshop on Distributed Event-Based Systems (DEBS'03), 2003) can aggregate information from multiple streams and deliver a message based on the aggregation. SMILE technology is, for example, capable of taking streams representing sales of seats on multiple airline flights and delivering a current number of available seats on the k cheapest flights to London to a subscriber.

Such mediations, however, only operate on simple text or numeric message attributes to provide a derived state to the subscriber. Further, message consumers typically receive only messages whose headers and properties match the selection criteria in the subscription that either specifies a single message or a history of messages. Currently, subscriptions do not select messages on the basis of the content of the message body.

With the advent of highly capable, wirelessly connected, widely distributed sensor networks, scenarios are emerging which require intelligent delivery of collected data in a timely fashion. These distributed sensor networks include sensors that capture audio and video and that can provide a wealth of data which may overlap in scope (for example, fields of view of the sensors) and coverage (for example, spatial and temporal resolution of sensors). These data provide new types of messages where the message body contains meaningful content and which can be varying in the quality of their content. While the evolution of the Web has increased information available via user pull, these new scenarios describe increased information available via push and via rich media streams. These new message types, in addition to having numeric or text data as metadata or message properties, contain unstructured information as its payload or message body.

Regardless of the content of messages, subscribers wish to receive only those messages that contain relevant data. Unlike structured payloads, a subscription to messages containing unstructured information is less accurately described if it were to rely only on specifying constraints to structured information available in the messages.

Consider the problem of a battlefield commander. The commander must keep aware of events transpiring on the battlefield. Low resolution satellite image feeds, higher resolution tank image feeds, and other multimedia information are being captured, but the commander bears the burden of sorting through all the images after they are received to obtain the most informative images. What is needed is a mechanism that will enable the commander to set up desired criteria for these multimedia messages in advance in such a way that he or she can choose to preferentially receive the most desired images. Current publish-subscribe messaging systems do not provide such a capability.

Continuing the battlefield scenario, there may be other subscribers in addition to the battlefield commander with different criteria for receiving images contained in message bodies. For example, a tank commander may want to receive images of a long view ahead of his/her tank in order to avoid ambush. This subscription must be satisfied from the same sensor data as that available to the battlefield commander; however, for this user, the criteria will be different (for example, the field of view in front of the tank as opposed to an overall view of the entire battlefield).

These various users of available sensor data would be served by specifying constraints on unstructured information in order to describe the subscription they desire. What is further needed, accordingly, is a mechanism that will provide message routing and subscription matching to users based on specified constraints of unstructured payloads. Specifically, what is needed is a mechanism for similarity matching of message payloads to subscriptions.

Consider the further example of a sensor on an oil pipeline. The sensor provides image data which is associated with metadata, such as time of image capture, location of sensor, etc. However, the payload of messages from this sensor contains far more information about the visual aspects of the field of view of the sensor. Currently, subscribers to such messages must examine all the messages or examine all the messages where the metadata fulfills a subscription specification (e.g. images taken between 11 PM and 12 PM). This becomes a problem since subscribers may receive too many messages (e.g. all messages) or too few messages (e.g. only messages that match a restrictive specification).

Furthermore, messages which fulfill a subscription specification of a subscriber may not result in data of interest to the subscriber. For example, images captured between 11 pm and 12 pm may all be identical and have no discriminating information. What is needed, accordingly, is a mechanism for specifying a subscription to images from the pipeline sensor that fulfills image criteria, such as brightness intensity or explosion in the images.

It should be noted that such unstructured payloads may be very large, and a messaging infrastructure should avoid unnecessary transmission of unneeded messages. What is also needed, accordingly, is a mechanism for restricting not only reception but also transmission of only those messages which are needed. This will allow improved scalability.

SUMMARY OF THE INVENTION

Exemplary embodiments provide a computer implemented method, system, and computer usable program code for routing messages in a message stream. A computer implemented method for routing messages in a message stream includes receiving a specification of desired messages, the specification containing a payload and receiving at least one message, the message containing a payload. The message payload is evaluated with respect to the specification payload and the specification, and the message is routed in accordance with the evaluation. Exemplary embodiments provide message routing and subscription matching to users based on similarity matching message payloads to subscriptions. The subscriptions may include an unstructured element, for example, a sample image, with a specification indicating a desire for messages that have similar payloads. Alternatively, the subscription may include a description that requires analysis of the message payload.

BRIEF DESCRIPTION OF THE DRAWINGS

The novel features believed characteristic of the exemplary embodiments are set forth in the appended claims. The exemplary embodiments, themselves, however, as well as a preferred mode of use, further objectives, and advantages thereof, will best be understood by reference to the following detailed description of an exemplary embodiment when read in conjunction with the accompanying drawings, wherein:

FIG. 4 is a diagram that schematically illustrates a publish-subscribe messaging system according to an exemplary embodiment;

FIG. 5 illustrates details of a message specification containing a payload according to an exemplary embodiment;

FIG. 7 is a flowchart of a method for routing messages in a message stream, wherein subscriptions are categorized in order to minimize transmissions, according to an exemplary embodiment.

DETAILED DESCRIPTION OF THE PREFERRED EMBODIMENT

Figure 1:
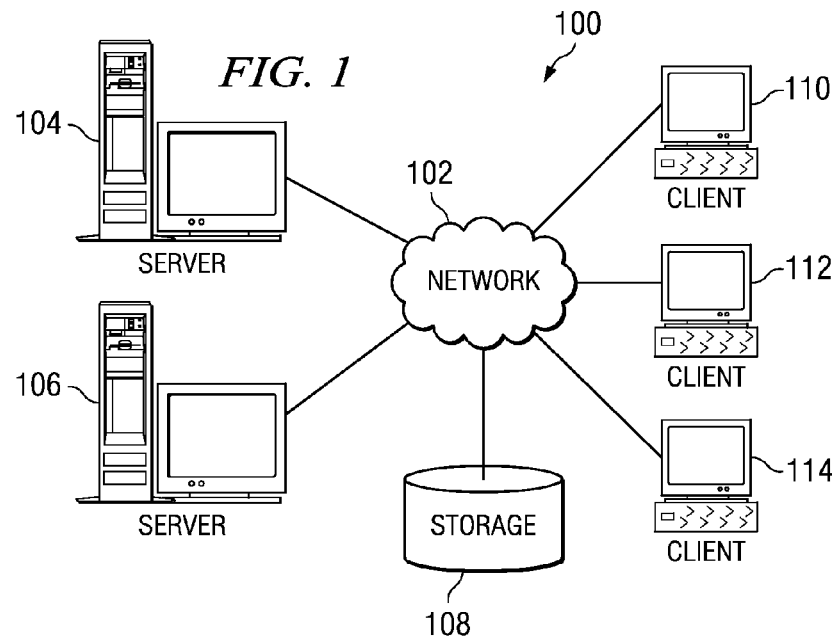
FIG. 1 depicts a pictorial representation of a network of data processing systems in which exemplary embodiments may be implemented.
Figure 2:
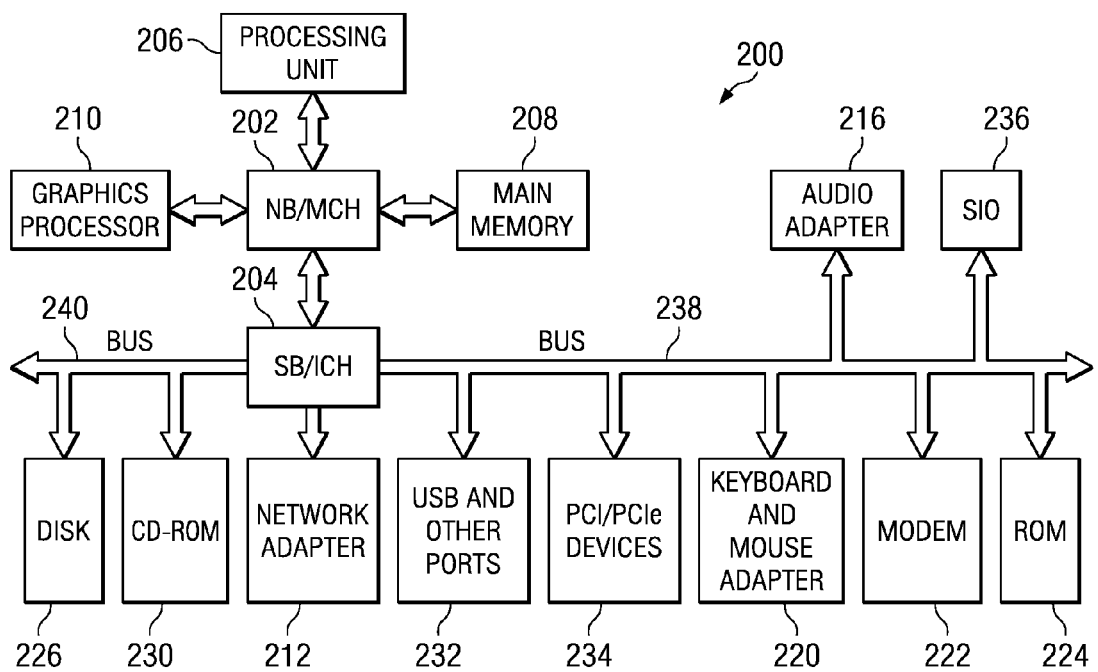
FIG. 2 depicts a block diagram of a data processing system in which exemplary embodiments may be implemented.

FIGS. 1-2 are provided as exemplary diagrams of data processing environments in which exemplary embodiments may be implemented. It should be appreciated that FIGS. 1-2 are exemplary only and are not intended to assert or imply any limitation with regard to the environments in which aspects or exemplary embodiments may be implemented. Many modifications to the depicted environments may be made without departing from the spirit and scope of the exemplary embodiments.

With reference now to the figures, FIG. 1 depicts a pictorial representation of a network of data processing systems in which exemplary embodiments may be implemented. Network data processing system 100 is a network of computers in which exemplary embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different exemplary embodiments.

With reference now to FIG. 2, a block diagram of a data processing system is depicted in which the exemplary embodiments may be implemented. Data processing system 200 is an example of a computer, such as server 104 or client 110 in FIG. 1, in which computer usable code or instructions implementing the processes for illustrative embodiments may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ Series® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for illustrative embodiments are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the exemplary embodiments may be applied to a multiprocessor data processing system.

In some illustrative examples, data processing system 200 may be a personal digital assistant (PDA), which is configured with flash memory to provide non-volatile memory for storing operating system files and/or user generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Exemplary embodiments provide a computer implemented method, system and computer usable program code for mediating published message streams in a distributed messaging system. A data processing device of the distributed messaging system may be implemented as a stand-alone computing device, or as a distributed data processing system in which multiple computing devices are utilized to perform various aspects of the exemplary embodiments.

In accordance with an exemplary embodiment, a network data processing system, such as network data processing system 100 illustrated in FIG. 1, provides a distributed messaging system that supports subscriptions. A subset of clients, for example, a subset of clients 110, 112 and 114 in FIG. 1, may be publishing clients, while others of the clients may be subscribing clients. Published events may also be generated by one or more servers, such as one or more of servers 104 and 106 in FIG. 1.

Figure 3:
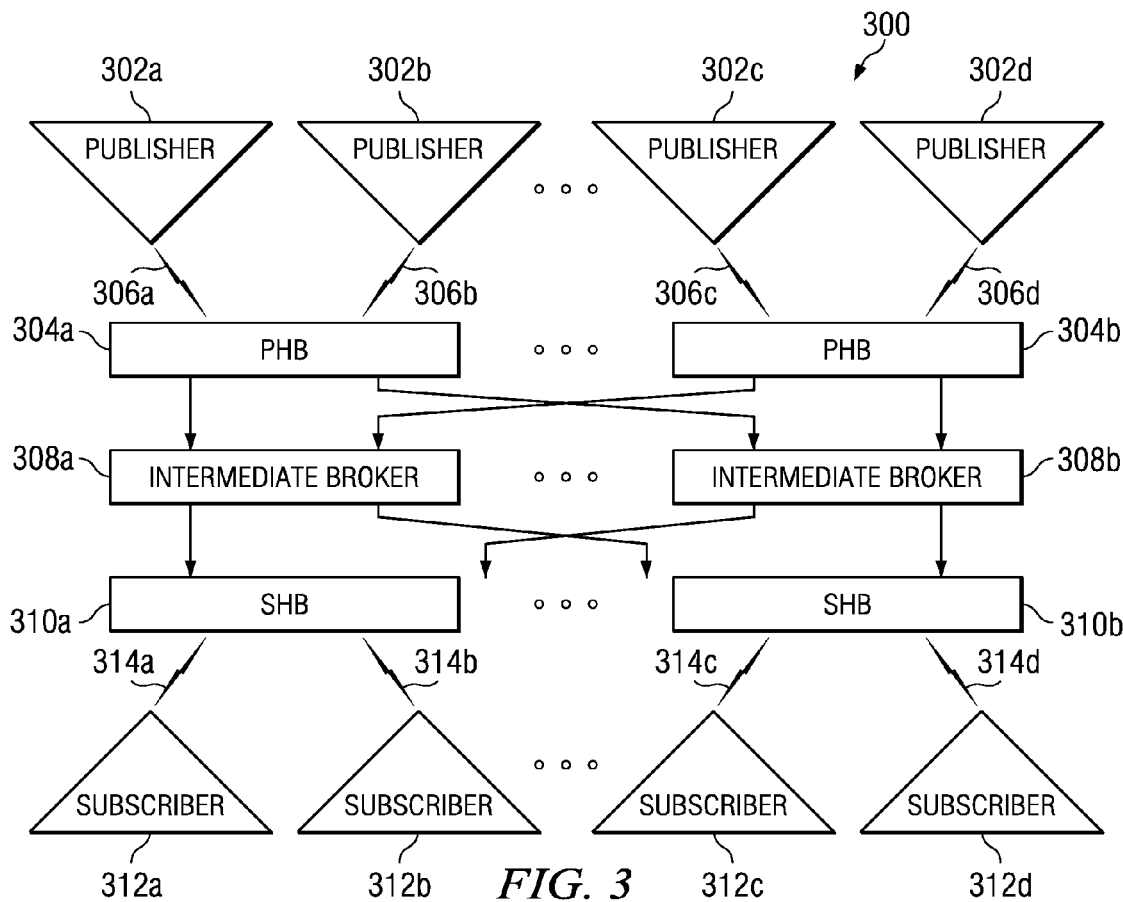
FIG. 3 is a diagram that schematically illustrates a broker network for a publish-subscribe messaging system according to an exemplary embodiment.

FIG. 3 is a diagram that schematically illustrates a broker network for a publish-subscribe messaging system according to an exemplary embodiment. The messaging system is implemented within an overlay network of service machines referred to as "brokers". One or more of servers 104 and 106 in FIG. 1, may, for example, be broker machines. A plurality of broker machines are responsible for delivery of messages sent by publishing clients towards subscribing clients based on the content of the messages and the subscriptions requested by the subscribing clients. Some broker machines may be specialized for hosting publishing clients, referred to as publisher hosting brokers (PHB), and others for hosting subscribing clients, referred to as subscriber hosting brokers (SHB). Between the PHBs and the SHBs, there may be any number of intermediate nodes that include routing and filtering. The brokers at the intermediate nodes are referred to as intermediate brokers or IBs. For expository purposes, this separation of brokers is assumed; however, in actual deployment, some or all of the broker machines may combine the functions of PHB, SHB and/or IB.

A publishing client, such as one of publishers 302a-302d establishes a connection to a PHB, such as PHB 304a or 304b over a corresponding one of client connections 306a-306d. Independently, a subscribing client, such as one of subscribers 312a-312d establishes a connection to a SHB, such as SHB 310a or SHB 310b over a corresponding one of client connections 314a-314d. The PHBs and SHBs are connected via intermediate brokers 308a-308b through an array of broker-to-broker links.

In the exemplary broker network depicted in FIG. 3, one or more execution engines may run on the brokers in the network and be interconnected. The one or more execution engines may be interconnected to form a distributed execution engine. The execution engines running on the plurality of broker machines receive input messages, process the input messages using transform objects, and route output messages toward subscribers. The broker-to-client and broker-to-broker connections may be, for example, any reliable first in-first out (FIFO) connection, such as a Transmission Control Protocol/Internet Protocol (TCP/IP) socket connection.

FIG. 4 is a diagram that schematically illustrates a publish-subscribe messaging system according to an exemplary embodiment. The system is generally designated by reference number 400, and in the exemplary embodiment, published messages, for example, image data provided by sensors 402, 404, 406 and 408, are grouped into non-overlapping similarity classes 412 and 414 by brokers 416 and 418. The number of similarity classes can be large or small and may be configured for broker network 410 which may be implemented as broker network 300 illustrated in FIG. 3. Examples of useful similarity classes are close-up views of human faces, distant views of human figures, smoke, and fire.

Based on their classification into such groupings, messages are routed on broker network 410 to nodes closest to the subscribers requiring messages in these classes. At the nodes closest to the subscribers, full matching is performed to provide subscription payloads 420, 422 and 424 to be furnished to different subscribers. This exemplary embodiment permits potentially unique subscription payloads to be kept in a restricted number of nodes and thereby not propagating them upstream. Other exemplary embodiments employ overlapping classes to a similar effect.

In another exemplary embodiment, at the subscription end, there may be a large number of subscriptions which can be potentially grouped into similarity classes to achieve the benefits of not replicating messages to multiple nodes closest to multiple subscribers. By similarity-based aggregation, subscriptions containing similar payloads are attached to nodes which receive messages of those classes. This exemplary embodiment permits computation heavy analysis to be resident in as few nodes as possible.

FIG. 5 illustrates details of a message specification containing a payload according to an exemplary embodiment. The specification is generally designated by reference number 500 and may contain, but is not limited to: subscriber information 502, topic of subscription 504 (as understood in traditional pub sub systems), parameterized constraints on the unstructured message payload 506, keywords or categories associated with the desired unstructured content 508, sample unstructured payload information 510, (or pointers to sample unstructured payload information), true/false indicator 512, and requested degree of match 514. True/false indicator 512 is useful when a subscriber wishes to receive all messages that do not fit a description as will be explained below.

Subscriber information 502 may include but is not limited to: address, affiliation (e.g. corporate), security access level, class of service authorized, alternate address, maximum message size desired, mediation selection (e.g. language translation), allowable hours for message delivery, alternate delivery destinations if communications cannot be established and the like. This information may be specified on a per message subscription basis or be obtained through a subscriber record where the subscriber may be an individual, an enterprise, or another group. The information may be received through data entry, local storage access, or through a network, such as a corporate LAN or the Internet.

Topic of subscription 504 may be entered as part of the subscription and used as in a traditional pubsub system as one filter for messages. Note that messages, containing unstructured information may also contain structured information. For example, in one application of an exemplary embodiment useful for fraud detection or for the detection of counterfeit currency, a message may be transmitted on a retailer's corporate network for every customer making a purchase, the message containing cash register location and an image of the customer. In this example, a topic filter may be used that selects only those purchases over $100. A further filter may be used to select images identified in such a way as to limit the messages to those matching whatever is known about a suspect.

Parameterized constraints on the unstructured message content 506 may include but are not limited to measures of lighting, of quality (e.g. focus, image contrast), of audibility, of distance to an object in focus, scale, viewpoint, etc.

Keywords 508 reflect knowledge which can be gained from image analysis. Such analysis is well-known in the art and can determine fine detail. Examples of detail which may be understood from image analysis, and therefore, examples of keywords which would be effective in a subscription according to exemplary embodiments, include but are not limited to: damaged vehicle, barcode, (e.g. whether the image contains a barcode), embedded text (e.g. as may be found on the image of a sign), face, body, dog, orange, etc. Note that these are not topics but rather information that can be gleaned from image analysis of a message payload.

Sample unstructured payload information 510 may include but are not limited to one or more images (e.g. jpg, tiff, and other formats), audio, and text. Examples of subscription sample payloads include images of a stolen vehicle, lost child, wanted suspect, object in a particular spatial relationship (e.g. 30 feet in front of a tank), and particular colors (e.g. flame on a green background). Multiple sample payloads may be included. This may be used to construct the equivalent of multiple subscriptions when categorization is required.

True/false indicator 512 is used when a subscriber wishes to receive messages unlike the payload sample. In the pipeline example described previously, images of the pipeline under various normal circumstances (e.g. day, night, with animals around) may be used as sample payloads and associated with an indicator of false. The subscription then indicates that only messages that do not look like any of the samples are to be transmitted. This allows selection of messages that contain patterns that have not been seen before.

In one exemplary embodiment, the requested degree of match 514 may be expressed as a confidence factor, that is, the confidence factor of the matching algorithm to determine whether a received payload matches a sample. In another exemplary embodiment, degree of match 514 may be expressed as high, medium, low, or with various numerical calibrations (e.g. on a scale of 1-10). As before, the degree of match required can be obtained interactively from the user on a per subscription basis or through other means. Interactive use may employ a selection of generated images to allow a user to indicate which generated images are sufficiently close to the payload image such that delivery of such a message would fulfill the user's requirements.

Figure 6:
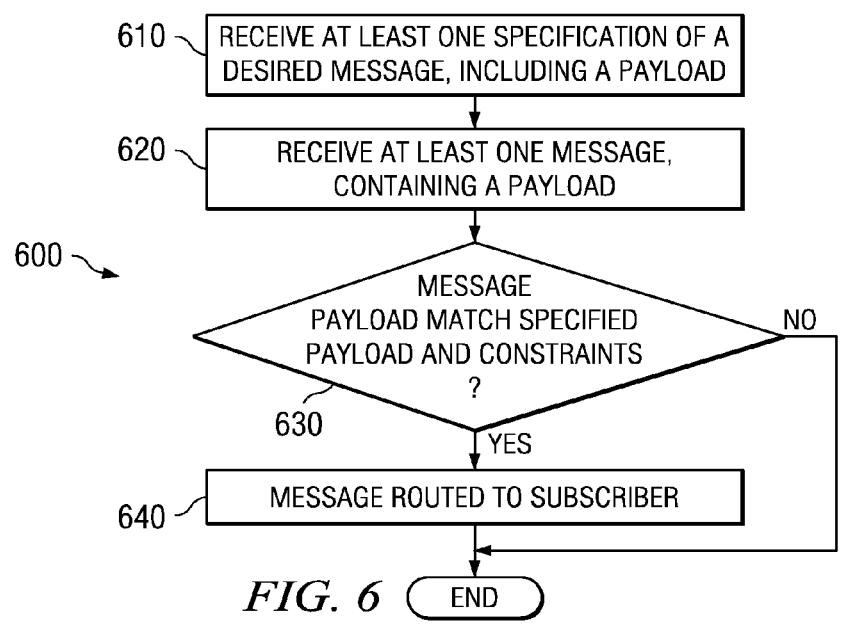
FIG. 6 is a flowchart of a method for routing messages in a message stream according to an exemplary embodiment.

FIG. 6 is a flowchart of a method for routing messages in a message stream according to an exemplary embodiment. The method is generally designated by reference number 600, and in the exemplary embodiment shown in FIG. 6, messages are not grouped into similarity classes but are handled individually.

The method begins with receiving at least one specification of a desired message, including a payload (Step 610). The specification may be a subscription such as illustrated in FIG. 5, although it should be understood that it is not intended to limit the exemplary embodiment to any particular specification.

At least one message containing a payload of unstructured information is then received (Step 620). Next, a determination is made as to whether the message payload matches the sample payload and constraints (Step 630). Analysis of unstructured information is well-known in the art. Algorithms are well-known to ascertain quality, focus, depth of field, and other unstructured information constraints. Further, one skilled in the art can determine loudness, embedded text, embedded barcodes, presence of an object or face, etc. This analysis then can be used to determine if the keywords or categories are possibly matched. Additionally, a comparison of images can determine similarity of color, similarity of face (e.g. face recognition), similarity of voice (e.g. voice recognition), as well as damage (e.g. damaged fruit or cars). That is, these analyses can provide payload matching. These algorithms may be performed serially or in parallel and may not all be available at all nodes.

For some messages, timeliness of delivery may be less of the essence and analysis may be conducted in batch mode as processing is available. For example, messages used for quality control may be used to validate or audit a process rather than to modify a workflow in progress. For example, as messages flow from one server to another, the quality control algorithm such as "sameness" detector or image or audio differencing algorithms can determine that the payloads have not been tampered with during transit.

If the message payload matches the specified payload and any constraints (Yes output of Step 630), the message is routed to the subscriber associated with the specification (Step 640), and the method ends. If the message payload does not match the specified payload and constraints (No output of Step 630), the method ends.

FIG. 7 is a flowchart of a method for routing messages in a message stream, wherein subscriptions are categorized in order to minimize transmission according to an exemplary embodiment. The method is generally designated by reference number 700 and begins by receiving at least one specification of a desired message, including a payload at a subscriber node (Step 710), similar to Step 610 in FIG. 6. This specification is received at the subscriber node, that is, at a node proximate to the subscriber. In an exemplary embodiment, this node is a minimal number of network hops away from the subscriber so that the amount of message transmission is reduced.

Next, at least one class, referred to as "Class A" in FIG. 7, in which the subscription may be placed is determined (Step 720). This determination can be based on, but is not limited to, analysis of the constraints, analysis of the subscriber information, and usefully, analysis of the unstructured sample payload. Such analysis in the subscriber node will partake of the same unstructured payload analysis routines as are to be performed in the distant nodes of the messaging system. Useful classes include but are not limited to: face, person, animal, fire, and vehicle. Also note that the classification may include beyond a simple class tag, a taxonomy or hierarchy of classes to which this belongs as a subclass.

An indication of the class just determined (Class A) is then provided (Step 730). This indication may be transmitted to all the nodes in the messaging network, that is, upon completion of Step 730, all nodes may understand that a subscription related to this subscriber node for Class A messages is in force. This allows distant nodes to send only Class A messages to this subscriber node rather than inundate the node with all possible messages for matching.

Next, a messaging node receives a message containing an unstructured payload (Step 740). In Step 750, as in Step 720, at least one class in which the subscription may be categorized is determined. If a subscription for the class determined in step 750 is active, the messaging node ensures that the message received in Step 740 is transmitted to the subscriber node associated with the subscription (Step 760).

The message is then received at the subscriber node (Step 770) and it is determined if the message satisfies the subscription criteria and has sufficient match to the subscriber unstructured information payload (Step 780). If there is a sufficient match (Yes output of Step 780), the message is delivered to the subscriber (Step 790), and the method ends. If there is not a sufficient match (No output of Step 780), the method simply ends.

Exemplary embodiments thus provide a computer implemented method, system and computer usable program code for routing messages in a message stream. A computer implemented method for routing messages in a message stream includes receiving a specification of desired messages, the specification containing a payload, and receiving at least one message, the message containing a payload. The message payload is evaluated with respect to the specification payload and the specification, and the message is routed in accordance with the evaluation.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for routing messages in a message stream, the computer implemented method comprising:
   receiving, by a subscribing hosting broker, a specification of desired messages from at least one subscribing client, the specification containing a specification payload;
   receiving, by a publishing hosting broker, at least one message from at least one publishing client, the message containing a message payload;
   evaluating, by one of the subscribing hosting broker, the publishing hosting broker, or a combination thereof, the message payload with respect to the specification payload and the specification; and
   routing, by one of the subscribing hosting broker, the publishing hosting broker, or a combination thereof, the message to the at least one subscriber in accordance with the evaluation.

2. The computer implemented method of claim 1, wherein receiving a specification of desired messages comprises:
   receiving, by the subscribing hosting broker, at least one of a constraint on an unstructured message payload, descriptive information determined through analysis of the unstructured message payload, and at least one example of the unstructured message payload.

3. The computer implemented method of claim 2, wherein receiving a constraint on an unstructured message payload comprises:
   receiving, by the subscribing hosting broker, at least one of a brightness constraint, a contrast constraint, a focus constraint, a zoom factor, a field of image constraint, a focal length constraint, a sensor viewpoint, a frequency range, and a decibel range.

4. The computer implemented method of claim 2, wherein receiving descriptive information determined through analysis of unstructured payload comprises:
   receiving, by the subscribing hosting broker, at least one of a color description, pitch description, an object description, a pattern description, and an object specification.

5. The computer implemented method of claim 2, wherein receiving the at least one example of the unstructured payload comprises:
   receiving, by the subscribing hosting broker, at least one of an image, an indication of an image, an audio file, and an indication of an audio specification.

6. The computer implemented method of claim 2, wherein receiving the specification of the desired messages further comprises:
   receiving, by the subscribing hosting broker, an indicator indicating whether similarity or dissimilarity is desired, wherein evaluating the message payload with respect to the specification payload and the specification includes evaluating the message payload with respect to the indicator.

7. The computer implemented method of claim 1, wherein receiving a specification of desired messages further comprises:
   receiving, by the subscribing hosting broker, a specification of a degree of match desired, wherein evaluating, by one of the subscribing hosting broker, the publishing hosting broker, or a combination thereof, the message payload with respect to the specification payload and the specification includes evaluating the message payload to determine whether the message payload matches the specification payload with respect to the degree of match desired, wherein the degree of match desired is a measure from a matching algorithm of matching between the message payload matches the specification payload a sample.

8. The computer implemented method of claim 7, wherein receiving the specification of the degree of match desired comprises;
   receiving, by the subscribing hosting broker, an indication of confidence factor desired.

9. The computer implemented method of claim 1, wherein evaluating the message payload with respect to the specification payload and to the specification comprises:
   evaluating, by one of the subscribing hosting broker, the publishing hosting broker, or a combination thereof, the message payload with respect to the specification payload and to the specification using a confidence factor.

10. The computer implemented method of claim 1, further comprising:
    receiving, by the subscribing hosting broker, a specification of a similarity class for published messages.

11. The computer implemented method of claim 1, further comprising:
    determining, by one of the subscribing hosting broker, the publishing hosting broker, or a combination thereof, a similarity class associated with the payload of the at least one message.

12. The computer implemented method of claim 1, further comprising:
    determining, by one of the subscribing hosting broker, the publishing hosting broker, or a combination thereof, a similarity class associated with the at least one message.

13. The computer implemented method of claim 12, further comprising:
    routing, by one of the subscribing hosting broker, the publishing hosting broker, or a combination thereof, the at least one message in accordance with the determined similarity class.

14. A computer implemented method for routing messages in a message stream, the computer implemented method comprising:
    receiving, by a subscribing hosting broker, a specification of desired messages from at least one subscribing client;
    determining, by the subscribing hosting broker, a specification of a similarity class for subscription payloads;

receiving, by a publishing hosting broker, at least one message from at least one publishing client, the message containing a payload;

evaluating, by one of the subscribing hosting broker, the publishing hosting broker, or a combination thereof, the message payload with respect to the similarity class specification payload and the subscriber specification; and routing, by one of the subscribing hosting broker, the publishing hosting broker, or a combination thereof, the at least one message to the at least one subscriber in accordance with the evaluation.

15. The computer implemented method of claim 14, wherein determining a specification of a similarity class for subscription payloads comprises:

receiving, by the subscribing hosting broker, at least one message containing a payload; and determining, by the subscribing hosting broker, at least one characteristic of the payload.

16. A computer implemented method for routing messages in a message stream, the computer implemented method comprising:

receiving, by the subscribing hosting broker, a specification of a desired message from at least one subscribing client, the specification containing a payload;

determining, by the subscribing hosting broker, at least one similarity class associated with the payload;

identifying, by the subscribing hosting broker, an indication of a subscription associated with the at least one similarity class;

receiving, by a publishing hosting broker, a message from at least one publishing client;

determining, by the publishing hosting broker, a similarity class associated with the message; and transmitting, by the publishing hosting broker, the message in accordance with the similarity class and the indication of the subscription associated with the at least one similarity class.

17. A hardware computer usable storage medium having computer usable program code encoded thereon for routing messages in a message stream, the computer program product comprising:

computer usable program code configured for receiving, by a subscribing hosting broker, a specification of desired messages from at least one subscribing client, the specification containing a specification payload;

computer usable program code configured for receiving, by a publishing hosting broker, at least one message from at least one publishing client, the message containing a message payload;

computer usable program code configured for evaluating, by one of the subscribing hosting broker, the publishing hosting broker, or a combination thereof, the message payload with respect to the specification payload and the specification; and computer usable program code configured for routing, by one of the subscribing hosting broker, the publishing hosting broker, or a combination thereof, the message to the at least one subscriber in accordance with the evaluation.

18. The hardware computer usable storage medium of claim 17, wherein the computer usable program code configured for receiving a specification of desired messages comprises:

computer usable program code configured for receiving, by the subscribing hosting broker, at least one of a constraint on an unstructured message payload, descriptive information determined through analysis of the unstructured message payload, or at least one example of the unstructured message payload.

19. The hardware computer usable storage medium of claim 18, wherein the computer usable program code configured for receiving constraint on unstructured message payload comprises:

computer usable program code configured for receiving, by the subscribing hosting broker, at least one of a brightness constraint, a contrast constraint, a focus constraint, a zoom factor, a field of image constraint, a focal length constraint, a sensor viewpoint, a frequency range, and a decibel range.

20. The hardware computer usable storage medium of claim 18, wherein the computer usable program code configured for receiving descriptive information determined through analysis of unstructured payload comprises:

computer usable program code configured for receiving, by the subscribing hosting broker, at least one of a color description, pitch description, an object description, a pattern description, and an object specification.

21. The hardware computer usable storage medium of claim 18, wherein the computer usable program code configured for receiving the at least one example of the unstructured payload comprises:

computer usable program code configured for receiving, by the subscribing hosting broker, at least one of an image, an indication of an image, an audio file, and an indication of an audio specification.

22. The hardware computer usable storage medium of claim 18, wherein the computer usable program code configured for receiving a specification of desired messages further comprises:

computer usable program code configured for receiving, by the subscribing hosting broker, an indicator indicating whether similarity or dissimilarity is desired, wherein evaluating the message payload with respect to the specification payload and the specification includes evaluating the message payload with respect to the indicator.

23. The hardware computer usable storage medium of claim 17, wherein the computer usable program code configured for receiving the specification of the desired messages further comprises:

computer usable program code configured for receiving, by the subscribing hosting broker, a specification of a degree of match desired, wherein evaluating, by one of the subscribing hosting broker, the publishing hosting broker, or a combination thereof, the message payload with respect to the specification payload and the specification includes evaluating the message payload to determine whether the message payload matches the specification payload with respect to the degree of match desired, wherein the degree of match desired is a measure from a matching algorithm of matching between the message payload matches the specification payload a sample.

24. The hardware computer usable storage medium of claim 23, wherein the computer usable program code configured for receiving the specification of the degree of match desired comprises;

computer usable program code configured for receiving, by the subscribing hosting broker, an indication of confidence factor desired.

25. The hardware computer usable storage medium of claim 17, wherein the computer usable program code configured for evaluating the message payload with respect to the specification payload and to the specification comprises:

computer usable program code configured for evaluating, by one of the subscribing hosting broker, the publishing hosting broker, or a combination thereof, the message payload with respect to the specification payload and to the specification using a confidence factor.

26. The hardward computer usable storage medium of claim 17, further comprising:

computer usable program code configured for receiving, by the subscribing hosting broker, a specification of a similarity class for published messages.

27. The hardward computer usable storage medium of claim 17, further comprising:

computer usable program code configured for determining, by one of the subscribing hosting broker, the publishing hosting broker, or a combination thereof, a similarity class associated with the payload of the at least one message.

28. The hardward computer usable storage medium of claim 17, further comprising:

computer usable program code configured for determining, by one of the subscribing hosting broker, the publishing hosting broker, or a combination thereof, a similarity class associated with the at least one message.

29. The hardward computer usable storage medium of claim 28, further comprising:

computer usable program code configured for routing, by one of the subscribing hosting broker, the publishing hosting broker, or a combination thereof, the at least one message in accordance with the determined similarity class.

30. A publish-subscribe messaging system for routing messages in a message stream, comprising:

a broker network, the broker network comprising:

a subscriber broker for receiving a specification of desired messages from at least one subscribing client, the specification containing a specification payload;

a publisher broker for receiving at least one message from at least one publishing client, the message containing a message payload; and an evaluating mechanism for evaluating the message payload with respect to the specification payload and the specification, and for routing the message to the at least one subscriber in accordance with the evaluation.

31. The publish-subscribe messaging system of claim 30, wherein the specification of desired messages comprises at least one of a constraint on unstructured message payload, descriptive information determined through analysis of the unstructured message payload, and at least one example of the unstructured message payload.

32. The publish-subscribe messaging system of claim 31, wherein the specification of the desired messages further comprises an indicator indicating whether similarity or dissimilarity is desired, wherein the evaluating mechanism evaluates the message payload with respect to the indicator.

33. The publish-subscribe messaging system of claim 30, wherein evaluating the message payload with respect to the specification payload and the specification includes evaluating the message payload to determine whether the message payload matches the specification payload with respect to the degree of match desired, wherein the degree of match desired is a measure from a matching algorithm of matching between the message payload matches the specification payload a sample.

34. The publish-subscribe messaging system of claim 30, wherein the evaluating mechanism further comprises a mechanism for evaluating the message payload with respect to the specification payload and to the specification using a confidence factor.

35. The publish-subscribe messaging system of claim 30, wherein the evaluating mechanism further comprises a mechanism for routing the at least one message in accordance with a determined similarity class associated with the at least one message.

* * * * *